US011423280B2

(12) United States Patent
Penubothula et al.

(10) Patent No.: US 11,423,280 B2
(45) Date of Patent: Aug. 23, 2022

(54) COGNITIVE COMMUTER ASSISTANT

(71) Applicant: International Business Machines Corporation, Armonk, NY (US)

(72) Inventors: Santosh R. K. Penubothula, Bangalore (IN); Lohit K. Namboodiri, Bangalore (IN); Prabuchandran Krithivasan Jayachandran, Bangalore (IN); Harish Guruprasad Ramaswamy, Madurai (IN); Pankaj S. Dayama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 15/795,447

(22) Filed: Oct. 27, 2017

(65) Prior Publication Data

US 2019/0130243 A1   May 2, 2019

(51) Int. Cl.
*G06N 3/00* (2006.01)
*G06N 5/04* (2006.01)
(Continued)

(52) U.S. Cl.
CPC ......... *G06N 3/006* (2013.01); *G01C 21/3415* (2013.01); *G01C 21/3461* (2013.01);
(Continued)

(58) Field of Classification Search
CPC ........ G06N 3/006; G06N 5/048; G06N 20/00; G01C 21/3608; G01C 21/3617;
(Continued)

(56) References Cited

U.S. PATENT DOCUMENTS 8,190,434 B2  5/2012  Kameyama
9,263,039 B2  2/2016  Cristo et al.
(Continued)

FOREIGN PATENT DOCUMENTS

WO  2004049210 A1  6/2004
WO  2015020354 A1  2/2015

OTHER PUBLICATIONS

Reisinger et al., "Conversational Assistant for In-car Task Management", Copyright 2004, American Association for Artificial Intelligence (www.aaai.org), IBM TJ Watson Research Center, 8 pages. http://citeseerxist.psu.edu/viewdoc/download?doi=10.1.1.544.1477&rep=rep1&type=pdf.

*Primary Examiner* — Jess Whittington
*Assistant Examiner* — Brian E Yang
(74) *Attorney, Agent, or Firm* — Scott Dobson

(57) ABSTRACT

A cognitive commuter assistant may provide alerts regarding sensitive conversation topics and smart excuse route suggestions. The cognitive commuter assistant may store user preferences and historical data related to past conversations between passengers and navigators. The cognitive commuter assistant may identify current location and destinations, and may further identify local information, such as news and cultural information, based on the current location and destination. The cognitive commuter assistant may monitor and analyze the conversation between a passenger and navigator to determine a first route to the destination. The cognitive commuter assistant may generate, based on user preferences, local information, the first route, and historical data, alternative route suggestions.

17 Claims, 7 Drawing Sheets

(51) Int. Cl.
*G01C 21/34* (2006.01)
*G01C 21/36* (2006.01)

(52) U.S. Cl.
CPC ..... *G01C 21/3476* (2013.01); *G01C 21/3484* (2013.01); *G01C 21/3608* (2013.01); *G01C 21/3617* (2013.01); *G06N 5/048* (2013.01)

(58) Field of Classification Search
CPC ............ G01C 21/3415; G01C 21/3461; G01C 21/3476; G01C 21/3484
See application file for complete search history.

(56) References Cited

U.S. PATENT DOCUMENTS

| | | | |
|---|---|---|---|
| 9,460,083 | B2 | 10/2016 | Fink et al. |
| 2002/0078034 | A1 | 6/2002 | Cho et al. |
| 2008/0112551 | A1* | 5/2008 | Forbes ................. H04M 3/436 |
| | | | 379/142.1 |
| 2009/0048771 | A1 | 2/2009 | Speier et al. |
| 2009/0210142 | A1 | 8/2009 | Couckuyt et al. |
| 2014/0058721 | A1 | 2/2014 | Becerra |
| 2017/0219367 | A1* | 8/2017 | Liu .................... G01C 21/3614 |
| 2018/0031385 | A1* | 2/2018 | Bostick ................ G06F 40/284 |
| 2018/0038703 | A1* | 2/2018 | Verma ................ G01C 21/3415 |
| 2018/0196796 | A1* | 7/2018 | Wu ........................ G06N 5/022 |
| 2018/0316635 | A1* | 11/2018 | Chiu ...................... G06F 40/30 |

\* cited by examiner

COGNITIVE COMMUTER ASSISTANT

BACKGROUND

The present disclosure relates generally to route mapping, and more particularly to cognitively generating alternate route suggestions.

Travelers and commuters may reach their destinations as passengers in a vehicle with a navigator. Communicating with the navigator is necessary to convey desired destination(s), waypoints, and/or route(s). Maintaining pleasant conversation with the navigator provides for increased safety for both navigator and passenger.

SUMMARY

Embodiments of the present disclosure include a method, computer program product, and system for providing cognitive commuter assistance.

Providing commuter conversation assistance may include storing user preferences, historical data for each user of a plurality of users, and historical data for each navigator of a plurality of navigators. A current location and destination for a user may be identified. Local information may be determined, based on the current location and destination. A conversation between the user and a navigator may be monitored. The audio input may be analyzed to determine a first route between the current location and the destination. One or more suggestions for a second route may be generated, based on the local information, user preferences, historical data, and the first route.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1A:
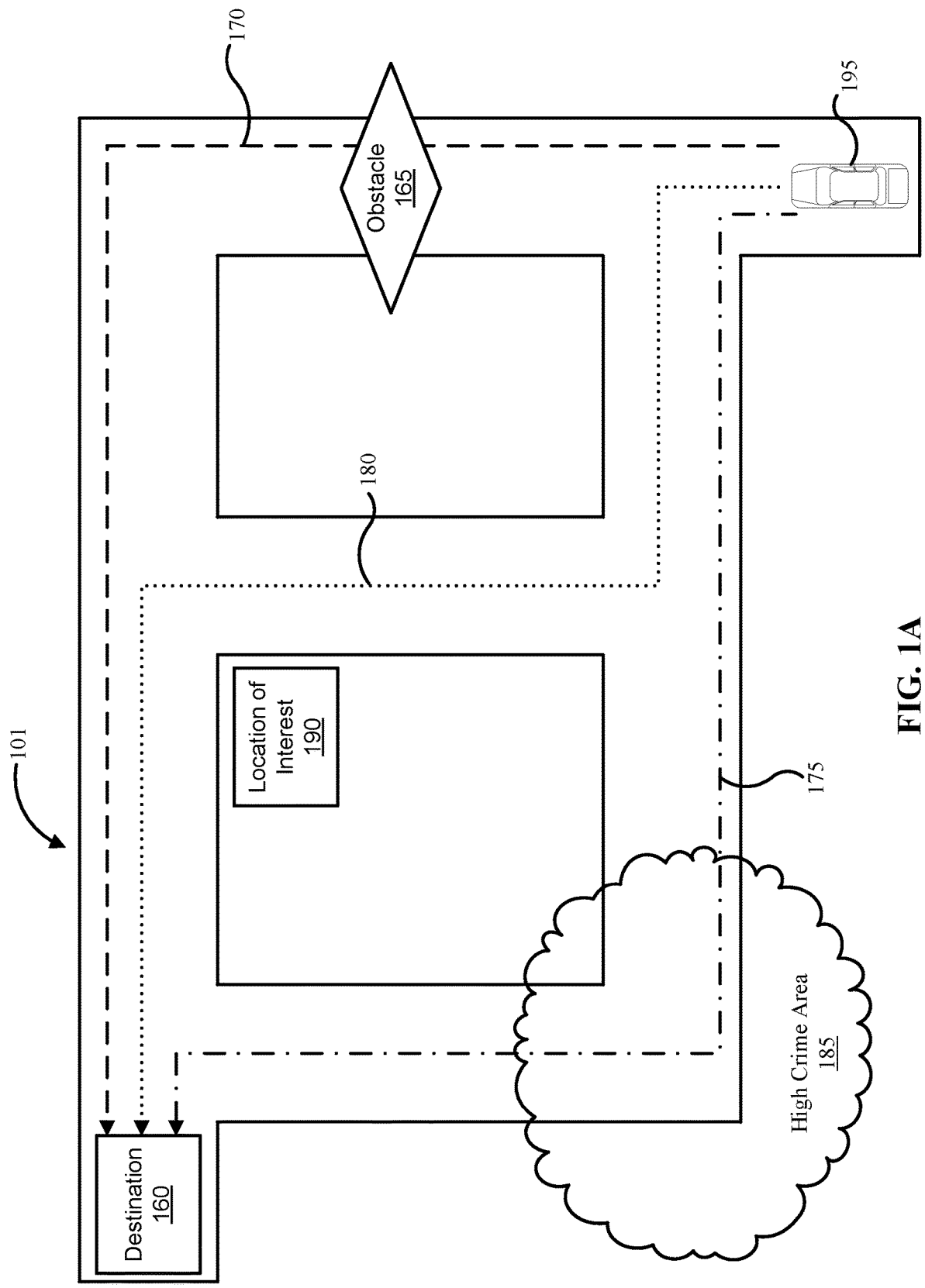
FIG. 1A illustrates a mapped example of a smart excuse suggestion, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of route mapping, and more particularly to cognitively generating alternate route suggestions. While the present disclosure is not necessarily limited to such applications, various aspects of the disclosure may be appreciated through a discussion of various examples using this context.

When traveling or commuting, a passenger may find themselves in a situation in which they wish to suggest a route that is different from the route the navigator (e.g., driver, pilot, helmsman, etc.) proposes. For example, there may be an obstacle (e.g., an automobile accident, road closure, airport closure, adverse weather, high-crime areas, areas where crimes recently occurred, etc.) that the passenger wishes, or needs, to avoid.

In such circumstances, a passenger/commuter/traveler may wish to suggest an alternate route. For example, the navigator-proposed route may run through a high-crime area, be slow or inefficient, be less-scenic, incur a toll, etc. Additionally, the passenger may wish to see a particular monument, or explore a particular location, etc. In these or other cases, the passenger may wish to travel by an alternate route, but may also wish to avoid insulting or irritating the navigator.

Embodiments of the present disclosure may employ analysis engine(s) (e.g., a cognitive commuter assistant) to perform natural language processing to identify the content of conversations between the passenger and the navigator, such as identifying current position and destination and identify current route and suggested route(s). The analysis engine(s) may also perform sentiment analysis to monitor the emotional tone of the conversation, provide suggestions for alternate routes, and provide plausible "smart excuse(s)" for route suggestions to avoid irritating the navigator. In embodiments, the cognitive commuter assistant may track conversation sentiment scores and passenger ratings to adjust or learn (e.g., receive feedback or analyze results and adjust behavior/output going forward) from past conversations. In embodiments, the cognitive commuter assistant may track fares and provide indications of the cost impact of an alternate or suggested route.

Traditional route identification and mapping systems are typically limited in their ability to monitor conversations and provide, in real time, conversation topics and fact-based route suggestions to ensure a pleasant interaction with the navigator while also ensuring that the passenger's desired route is executed.

In embodiments, passengers and/or navigators may have preference profiles that may be generated through user input, and/or by analyzing past conversations between passengers and navigators. For example, audio/video content captured by a device may be parsed and analyzed using data structuring techniques, such as natural language processing (NLP), audio fingerprinting, facial recognition, and emotional interpretation (e.g., sentiment identification) techniques. Structured output resulting from these techniques may be analyzed and scored to generate and/or update preference profiles for passengers and navigators.

Passenger and navigator preference profiles may include information regarding the characteristics and personality aspects of the passenger and navigator. For example, a preference profile may include demographic information (e.g., age, income, occupation, education, etc.) as well as personality information (e.g., likes, dislikes, hobbies, etc.). Preference profiles may be generated with input from a user-completed questionnaire, or by gleaning information from the structured data obtained from conversations between passengers and navigators.

Structured data may be derived from audio/video inputs to the cognitive commuter assistant. Individual voices may be identified and parsed (e.g., via audio fingerprinting or similar techniques) from audio or video inputs, in preparation for natural language processing analysis. NLP may be used to analyze the conversation between a passenger and navigator and to provide input for sentiment analysis. In embodiments, facial recognition techniques may be employed to augment the sentiment analysis.

Sentiment analysis may include, for example, generating an emotional score for the navigator and comparing that score to a threshold to determine whether the navigator is experiencing a pleasant interaction with the passenger.

The structured output may also be used to identify locations and routes, and to provide conversation topics, route suggestions, and smart excuses for suggesting a route.

A "smart excuse" may be an excuse with a factual basis, tailored to the preferences of the passenger and/or the navigator and taking into account local information. A smart excuse may be meant to increase the chances of a pleasant interaction while convincing the navigator to travel along the passenger's suggested route. A smart excuse may include, for example, a suggestion coupled with a factual reference (e.g., to a particular landmark, location, etc.). Sentiment analysis results may be fed back into the suggestion-generation process to adjust and learn what topics lead to a pleasant experience for a particular driver, or for the drivers of a certain location/region, in general. In embodiments, user/passenger ratings of a conversation may also be utilized in the learning process.

Smart excuses may be coupled with a route suggestion to generate a smart excuse suggestion. Smart excuse suggestions may be spontaneously generated and/or may follow templates, such as, "I would like to see X on the way to Y; would it be possible to take Z to get there?"

As discussed above, aspects of the disclosure may relate to the field of route mapping, and more particularly to cognitively generating alternate route suggestions. Accordingly, an understanding of the embodiments of the present disclosure may be aided by describing a mapped example of alternate route suggestion generation. Referring now to FIG. 1A, illustrated is a mapped example 101 of a smart excuse suggestion, in accordance with embodiments of the present disclosure. A user's current location is represented at 195, and the user's destination is illustrated at 160. A navigator may initially state that he/she plans on taking route 170 to destination 160. However, there may be an obstacle (e.g., road construction, vehicle accident, police activity, etc.) that prevents the navigator from taking the planned route.

In response to the obstacle 165, the navigator may suggest taking an alternate route 175 to destination 160. Alternate route 175, however, may pass through high crime area 185. The cognitive commuter assistant may be able to determine this based on local information, as described herein, and may display a smart excuse suggestion to the user to prompt the user to suggest a third route 180, while providing a fact-supported excuse that the user wishes to see a location of interest 190 (e.g., location of interest 190 may be listed as the type of location the user is interested in on the user's preference profile) on the way to destination 160. In embodiments, the cognitive commuter assistant may also alert the user to avoid the topic of the high crime area, as it may irritate the navigator.

For example, if a passenger is traveling from Prague-Ruzyne airport to a hotel in the Vysehrad district via taxi, the navigator (e.g., taxi driver) may suggest a route via highway 7, then Prague Circle and Podbelohorska street, crossing the Palace Bridge to arrive in the Vysehrad district. The cognitive commuter assistant may use NLP and GPS positioning to identify, from the conversation between the passenger and the taxi driver, the route the taxi driver suggested. If the passenger wishes to avoid Podbelohorska street for some reason (e.g., wishes to avoid traffic congestion, take a scenic route, etc.), the cognitive commuter assistant may suggest an alternate route, based on the passenger's preferences. For example, if the passenger has an interest in water parks, the cognitive commuter assistant may suggest the passenger say, "I would like to see AquaDream waterpark on the way to Vysehrad; would it be possible to take K Barrandovu street to get there?" In embodiments, the passenger may explain to the navigator that they are going to water park AquaDream during their stay in Prague, and would like to drive past it on their way to the Vysehrad district. The suggested route may pass water park AquaDream while avoiding Podbelohorska, and the smart excuse provides a convincing, fact-supported reason for avoiding the taxi driver's proposed route.

Figure 1B:
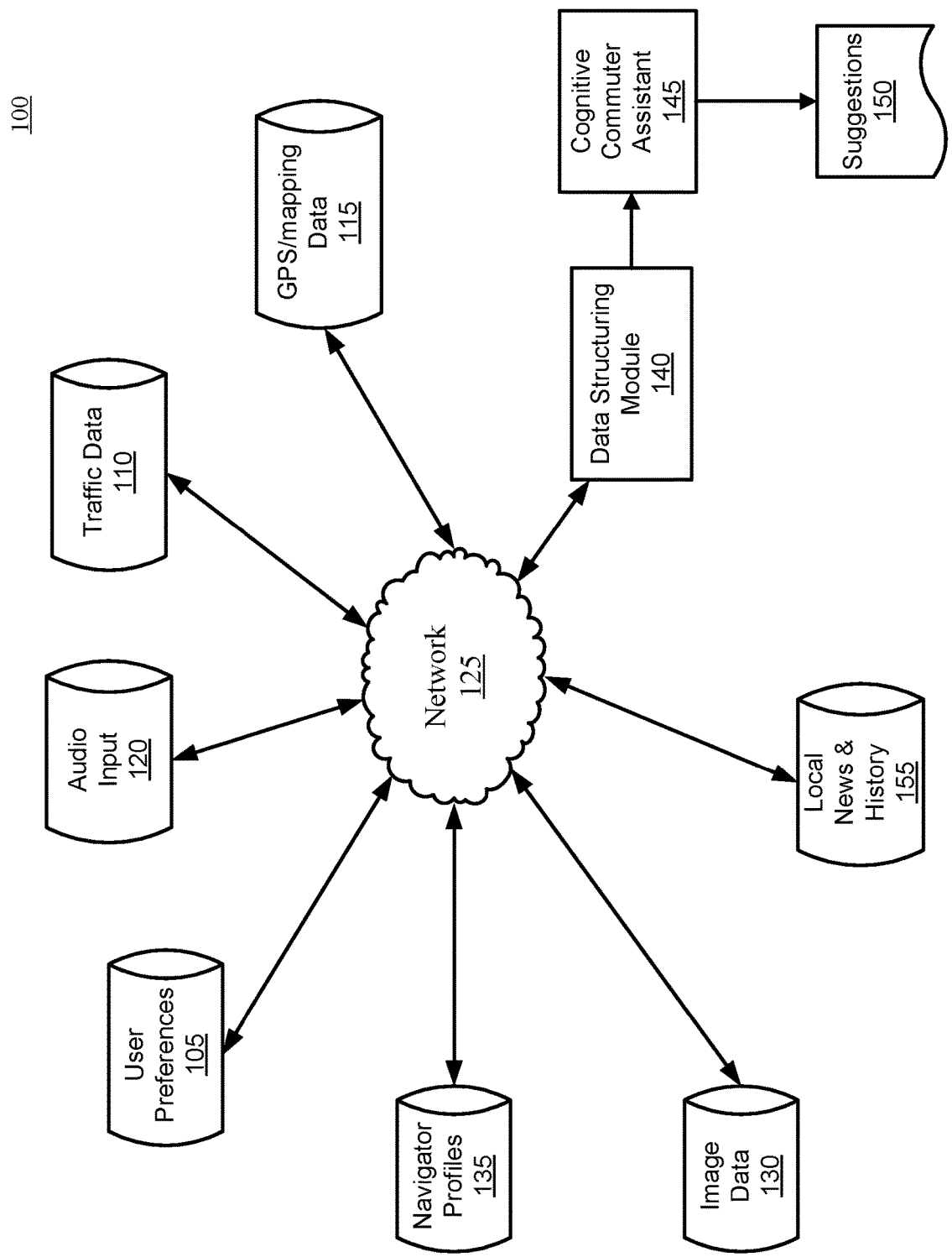
FIG. 1B illustrates a diagram of an example network environment for collecting and structuring data, in which illustrative embodiments of the present disclosure may be implemented.

An understanding of the embodiments of the present disclosure may be aided by describing embodiments of data-structuring systems (e.g., systems that convert unstructured, raw data into structured, machine-useable data) and the environments in which these systems may operate, such as networking environments and computer environments. Turning now to FIG. 1B, illustrated is a diagram of an example network environment 100 for collecting and structuring data, in which illustrative embodiments of the present disclosure may be implemented.

Example network environment 100 may include a plurality of data sources, such as user preferences 105, traffic data 110, GPS/mapping data 115, audio input 120, image data 130, navigator profiles 135, local news & history 155, and others. In certain embodiments, the data sources (e.g., user preferences 105, traffic data 110, GPS/mapping data 115, audio input 120, image data 130, navigator profiles 135, local news & history 155, and others) may reside in the storage of a single device, or may be distributed across the storage of a plurality of devices. Data collected from the data sources may include historical data (e.g., data corresponding to a particular time and location, such as data regarding past conversations a user/passenger has executed with one or more navigators), or the data may be collected in real-time. In embodiments, historical data may include, for example, that navigators from a certain region respond well to suggestions associated with a certain type of attraction/venue/food/etc., whereas navigators of a certain age/gender respond poorly to another type of attraction/venue/food/etc.

In embodiments, a single type of data (e.g., user preferences, for example) may reside in the storage of a single device, or may reside in the storage of several devices connected either locally or remotely via a network, such as network 125. In embodiments, the data sources and other devices connected to network 125 may be local to each other, and communicate via any appropriate local communication medium.

In embodiments, user preferences 105 may include demographic and personal information of a passenger/commuter/traveler, as described herein. For example, user preferences 105 may include demographic information (e.g., age, income, occupation, education, residence, etc.) as well as personality information (e.g., likes, dislikes, hobbies, etc.). In embodiments, user preferences 105 may include information inferred from tracking the location of a user's device (e.g., if a user spends a few hours a week at a cinema, it may be inferred the user is a movie-goer), monitoring the user's behavior on social media sites, monitoring the user's shopping habits, etc. Preference profiles may be generated with input from at least part of a user-completed questionnaire, or by gleaning information from the structured data obtained from conversations between users and navigators. In embodiments, preference profiles may be compiled by monitoring a user's social media accounts, e-mails, text messages, etc. to determine personality and demographic information.

In embodiments, traffic data 110 may include information regarding traffic statistics, road construction events, route obstructions, route closures, etc. for a particular region, a radius around a passenger/user device, or for a particular route from the passenger/user's current location to the passenger/user's destination. Traffic data may further include estimations for an estimated time of arrival (ETA), fare calculations, and fuel efficiencies.

GPS/mapping data 115 may include GPS coordinates or other positioning systems, and route maps, such as road maps, nautical maps, aerial corridor maps, etc. In embodiments, GPS/mapping data may further include various map overlays, such as crime maps (e.g., maps that illustrate high-crime areas, pinpoint individual crime reports, etc.), weather maps, tourist site maps, etc.

Audio input 120 may include audio input of a conversation between a navigator and a passenger/traveler/user. Conventional mapping applications are typically limited in their ability to incorporate conversations and obtain a wide variety of data (e.g., local information, navigator preferences, crime statistics/information, local news and history, etc.) Audio input may be captured in audio format, or it may be captured as part of a video format. In embodiments, audio input may include input generated by a hearing-impaired assistance module (e.g., a text telephone (TTY) or telecommunication device for the deaf (TDD)).

Image data 130 may include any images related to a user/traveler/passenger and/or a navigator. Image data may include images or video captured by a user's device. A user's device may include, for example, a smartphone, a laptop, a tablet, or any other mobile device. In embodiments, image data may be utilized when analyzing the sentiment of a user or navigator.

Navigator profiles 135 may include demographic information (e.g., age, income, occupation, education, residence, etc.) as well as personality information (e.g., likes, dislikes, hobbies, etc.). In embodiments, navigator profiles 135 may include information inferred from tracking the location of a navigator (e.g., if a navigator spends a few hours a week at a cinema, it may be inferred the navigator is a movie-goer), monitoring the navigator's shopping habits, etc. Navigator profiles may be generated with input from at least part of a navigator-completed questionnaire, or by gleaning information from the structured data obtained from conversations between users and navigators. In embodiments, navigator profiles may be compiled by monitoring a navigator's social media accounts, e-mails, text messages, etc. to determine personality and demographic information. In embodiments, a user/passenger in a particular instance may later become a navigator, and the user preference profile for that navigator may be used as the navigator profile. For example, if a user/passenger, Bob, is a ridesharing/taxi driver by trade, Bob's user preference profile may double as Bob's navigator profile when Bob drives his vehicle/taxi.

Local news & history 155 may include information regarding a user's current location as well as the user's destination. Current location and destination may be deduced/calculated via GPS positioning and mapping data. Local news and history may include, for example, information regarding a region's customs, current events, weather events, historical events, cultural/ethnic tensions, etc. Local news and history may provide insight into whether a particular conversational topic should be avoided, or whether it may be of particular interest to a navigator, thereby allowing a user/passenger to conduct a more pleasant interaction with the navigator. For example, if a passenger is traveling from Provo to Salt Lake City just after a University of Utah vs. Brigham Young University football game, it may be wise to either avoid the topic of the game or to engage in a conversation about it, depending on whether the navigator's preferred team won or lost. In another example, the passenger may be notified of cultural or linguistic pitfalls, such as whether to tip the navigator and/or false cognates.

In some embodiments, the various data sources, data structuring module 140, and cognitive commuter assistant 145 may be connected via network 125. The network 125 can be implemented using any number of any suitable communications media. For example, the network 125 may be a wide area network (WAN), a local area network (LAN), an internet, or an intranet. For example, the data structuring module 140 and cognitive commuter assistant 145 and one or more data sources may communicate using a local area network (LAN), one or more hardwire connections, a wireless link or router, or an intranet.

In some embodiments, the data structuring module 140 and cognitive commuter assistant 145 and one or more data sources may be communicatively coupled using a combination of one or more networks and/or one or more local connections. For example, the data structuring module 140 may be hardwired to the cognitive commuter assistant 145 (e.g., connected with an Ethernet cable, hardwired together as components of a larger computer system, etc.), while the data sources may communicate with the data structuring module 140 and cognitive commuter assistant 145 using the network 125 (e.g., over the Internet or an intranet).

In embodiments, data structuring module 140 and/or cognitive commuter assistant 145 may employ "crawlers" (e.g., webpage/information retrievers) and/or "scrapers" (e.g., data extractors) to access the various data sources to mine relevant data at particular intervals, or in real-time. Crawlers/scrapers may be configured to "patrol" (e.g., perform particular actions at particular intervals) various data sources in search of relevant data (e.g., social media posts, local news articles, weather data, local history/cultural data, etc.). For example, a crawler may be configured to identify and retrieve articles describing the culture of the region(s) where a passenger's current location and/or destination are. Crawlers may further be configured to "crawl" (e.g., to search within certain boundaries/sites at either predefined or random time intervals) through a database or data source at a given interval, and/or to retrieve documents that have been updated or modified subsequent to a previous retrieval. In embodiments, crawlers may further be configured to generate certain types of data (e.g., a crawler may be configured to use a camera connected to a user/passenger's device to capture one or more images). Data fitting the crawler's/scraper's parameters may be retrieved, and if needed, analyzed and converted from an unstructured state into a structured state via data structuring module 140.

Structured data related to a particular user/passenger and/or navigator may be combined and analyzed to generate suggestions 150. Data from the various sources may be utilized by cognitive commuter assistant 145, using the methods described herein, to determine suggestions for conversation between the passenger and the navigator. Suggestions may include topics to avoid, topics to engage, or smart excuses for alternate routes. In embodiments, the cognitive commuter assistant may monitor the conversation between a user/passenger and a navigator to generate sentiment scores for use in refining suggestions and identifying topics that should be avoided with a particular navigator.

In embodiments, sentiment score may be an integer result of a calculation of a navigator and/or passenger's emotional state (e.g., a composite score calculated based on one or more matrices whose values represent individual emotions/traits and intensities), or it may be an array of values representing particular emotions, their intensities, duration, trends, etc. In embodiments, a sentiment score may alternatively, or additionally, represent the rate of change in a navigator or user's emotional state. For example, cognitive commuter assistant 145 may identify, based on monitored conversations between the user/passenger and navigator, that the navigator is experiencing an increase in anger, irritation, resentment, etc. The sentiment score may be used by the cognitive commuter assistant 145 in determining which topics to suggest, and/or in determining which smart excuses to generate.

In embodiments, example network environment 100 may include known, conventional pieces; however, the non-conventional and non-generic association/arrangement of any conventional pieces included therein may provide for the ability to cognitively provide alternative route suggestions while maintaining a pleasant conversation between a passenger and navigator.

Figure 2:
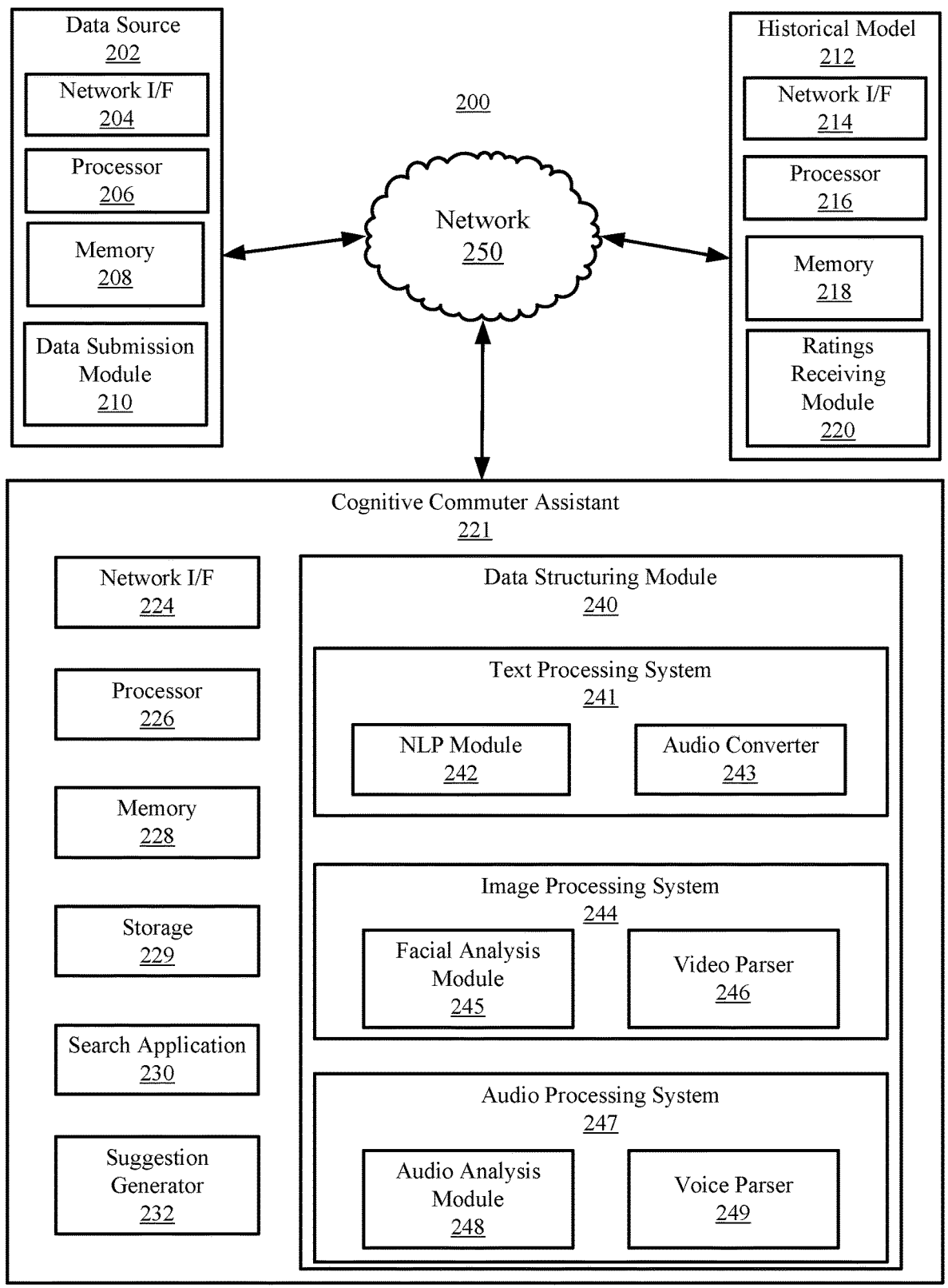
FIG. 2 illustrates a block diagram of an example computing environment for structuring data and generating conversational outputs, in accordance with embodiments of the present disclosure.

Referring now to FIG. 2, illustrated is a block diagram of an example computing environment 200 for an example computing environment for structuring data and generating conversational outputs, in accordance with embodiments of the present disclosure. Consistent with various embodiments, the cognitive commuter assistant 221, the data source 202, and the historical model 212 may include, or be, computer systems. The cognitive commuter assistant 221, the data source 202, and the historical model 212 may include one or more processors 226, 206, and 216 and one or more memories 228, 208, and 218, respectively.

The cognitive commuter assistant 221, the data source 202, and the historical model 212 may be configured to communicate with each other through an internal or external network interface 224, 204, and 214. The network interfaces 224, 204, and 214 may be, for example, modems or network interface cards. The cognitive commuter assistant 221, the data source 202, and the historical model 212 may be equipped with a display or monitor (not pictured). Additionally, the cognitive commuter assistant 221, the data source 202, and the historical model 212 may include optional input devices (e.g., a keyboard, mouse, scanner, or other input device), and/or any commercially available or custom software (e.g., browser software, communications software, server software, speech recognition software, natural language processing software, facial recognition software, audio fingerprinting software, search engine and/or web crawling software, filter modules for filtering content based upon predefined parameters, etc.). In some embodiments, the cognitive commuter assistant 221, the data source 202, and the historical model 212 may include or be servers, desktops, laptops, or hand-held devices.

The cognitive commuter assistant 221, the data source 202, and the historical model 212 may be distant from each other and communicate over a network 250. In some embodiments, the cognitive commuter assistant 221, the data source 202, and the historical model 212 can establish a communication connection, such as in a client-server networking model. Alternatively, the cognitive commuter assistant 221, the data source 202, and the historical model 212 may be configured in any other suitable networking relationship (e.g., in a peer-to-peer configuration or using any other network topology).

In embodiments, data source 202 may be substantially similar to any individual, any combination of, or all of the various data sources discussed in FIG. 1B. Data source 202 may submit data, using data submission module 210, via network 250 to the cognitive commuter assistant 221. Cognitive commuter assistant 221 may then generate a suggestion for a conversation topic or a smart excuse for suggesting and alternate route. The cognitive commuter assistant may further monitor the conversation between a passenger and a navigator to generate a sentiment score for the passenger and/or the navigator. The sentiment score(s) may be used by the cognitive commuter assistant to determine whether the topic suggestions and/or smart excuses should be altered. In embodiments, a user may rate a suggestion or smart excuse to provide feedback, via ratings receiving module 220.

In some embodiments, the historical model 212 may include an archive of past conversations between one or more users/passengers and a plurality of navigators. Historical model 212 may contain cross-referenced and annotated (e.g., structured) conversations that can be used by a recursive neural network, or other cognitive system, to identify topics to avoid, given a set of circumstances, such as navigator identity, local/regional information, etc. In embodiments, the historical model 212 may enable users/passengers/travelers to submit (or may submit automatically with or without user input) ratings to determine whether a particular conversation or passenger-navigator interaction was pleasant. For example, historical model 212 may include a user interface (UI). The UI may be any type of interface (e.g., command line prompts, menu screens, graphical user interfaces). The UI may allow a user to interact with the historical model 212 to submit rating information to the cognitive commuter assistant 221.

In embodiments, the cognitive commuter assistant 221 may include a data structuring module 240. Data structuring module 240 may be substantially similar to data structuring module 140 of FIG. 1B.

In some embodiments, the data structuring module 240 may include a text processing system 241. The text processing system 241 may include a natural language processing (NLP) module 242 and an audio converter 243. In embodiments, the audio converter 243 may use speech-to-text conversion techniques to convert a sound recording into text. The NLP module 242 may include numerous subcomponents for converting unstructured text into machine-readable data, such as a tokenizer, a part-of-speech (POS) tagger, a semantic relationship identifier, and a syntactic relationship identifier. NLP module 242 may output structured data (e.g., machine-readable data) to populate a text index, triplestore, or relational database that may be stored, for example, in storage 229.

In some embodiments, the data structuring module 240 may include an image processing system 244. The image processing system 244 may include a facial analysis module 245 and a video parser 246. In embodiments, video parser 246 may parse frames of a video into static/still images. Facial analysis module 245 may include numerous subcomponents for recognizing and analyzing one or more images of a user's and/or navigator's face, such as a facial object identifier, distance measurer, etc. In embodiments, the user's and/or navigator's facial expressions may be monitored to determine, or be factored into, a sentiment score for the user and/or navigator.

Unstructured data associated with facial expressions (e.g., position of eyebrows, curvature of the mouth, wideness of eyes/pupils, etc.) may be converted into structured data the system can use to determine emotions experienced by the user/passenger and/or navigator and the intensities of those emotions. The facial expressions may be determined to be associated with various emotions and their intensities, either by using predetermined values, or by monitoring the user/passenger and/or navigator over time. This facial expression data may then be structured and stored using facial recognition techniques.

In embodiments, facial expression data may be weighted and/or compared to textual data and stored in a triplestore or relational database, for example, in storage 229. For example, in embodiments, it may be determined that facial expression data leads to a more accurate determination (over textual data) of a user's or a navigator's emotions, but not necessarily emotional intensities. In such a case, facial expression data may be weighted more heavily than textual data when evaluating the emotions a user/passenger or navigator is/was experiencing, and those weights may not necessarily affect a determination of the intensity of those emotions.

In some embodiments, data structuring module 240 may include an audio processing system 247. The audio processing system 247 may include an audio analysis module 248 and a voice parser 249. In some embodiments, unstructured audio data may include several voices (e.g., a user/passenger, one or more non-user passengers, a navigator, etc.). Voice parser 249 may isolate individual voices in a single audio file using audio fingerprinting/voiceprinting techniques to identify a particular voice. Audio analysis module 248 may analyze a raw (e.g., unstructured) sound recording of a user's or a navigator's voice to identify their emotions and emotional intensities (e.g., structuring the audio data) by tracking vocal stress patterns (e.g., tone deviations, vocal cracking, atypical pauses, etc.). Audio analysis module 248 may output this structured audio data into a triplestore or relational database, for example, in storage 229. In embodiments, audio data may be weighted and/or compared to facial expression data or textual data. In embodiments, acoustic models may be applied to account for environmental variations in the sound recordings.

The search application 230 may be implemented using a conventional or other search engine, and may be distributed across multiple computer systems. The search application 230 may be configured to search one or more databases (e.g., data sources), as described herein, or other computer systems for content that is related to audio input data (e.g., to identify and/or determine the definition of a word or phrase used by a navigator or passenger) or data submitted by, or retrieved from, a data source 202. For example, the search application 230 may be configured to search dictionaries, papers, and/or archived conversations to help identify one or more emotions, emotional intensities, etc. associated with a user or navigator.

The suggestion generator 232 may be configured to compile and analyze data from various data sources to identify topics that should be avoided, or to generate a smart excuses. The suggestion generator 232 may include one or more modules or units, and may utilize the search application 230, to perform some of its functions (e.g., to identify definitions/connotations of words encountered when monitoring a conversation, analyzing a news article, or otherwise processing data from a data source).

Cognitive commuter assistant 221 may further include storage 229 for storing conversation logs, ratings, preference profiles, etc., as well as text indices, triplestores, and relational databases.

While FIG. 2 illustrates a computing environment 200 with a single cognitive commuter assistant 221, a single data source 202, and a single historical model 212, suitable computing environments for implementing embodiments of this disclosure may include any number of cognitive commuter assistants, data sources, and historical models. The various models, modules, systems, and components discussed in relation to FIG. 2 may exist, if at all, across a plurality of cognitive commuter assistants, data sources, and historical models. For example, some embodiments may include two cognitive commuter assistants and multiple data sources and historical models. The two cognitive commuter assistants may be communicatively coupled using any suitable communications connection (e.g., using a WAN, a LAN, a wired connection, an intranet, or the Internet). The first cognitive commuter assistant may include a natural language processing system configured to receive and analyze unstructured textual data, and the second cognitive commuter assistant may include an image processing system configured to receive and analyze images/videos of users/employees.

It is noted that FIG. 2 is intended to depict the representative major components of an exemplary computing environment 200. In some embodiments, however, individual components may have greater or lesser complexity than as represented in FIG. 2, components other than or in addition to those shown in FIG. 2 may be present, and the number, type, and configuration of such components may vary.

Figure 3:
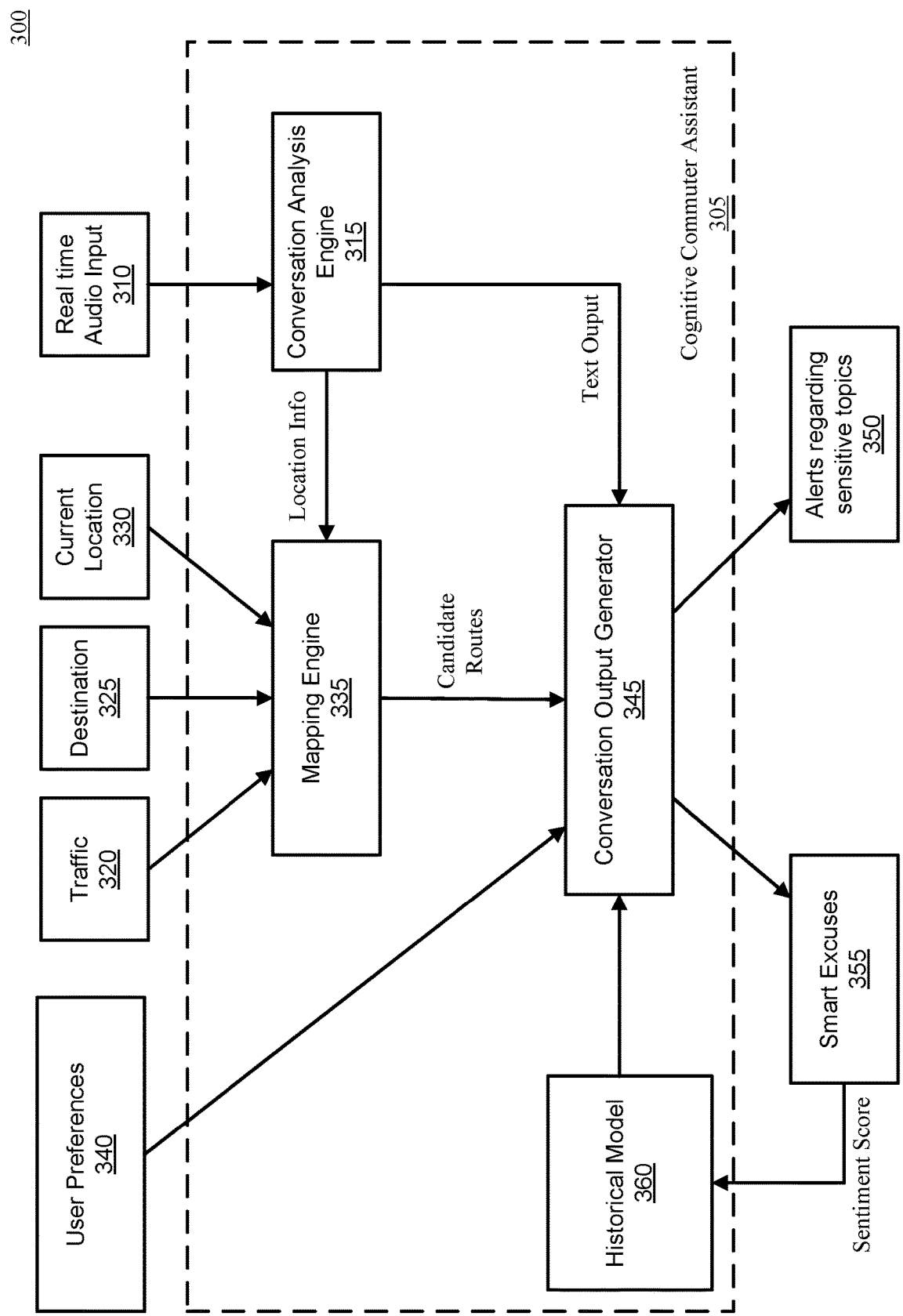
FIG. 3 illustrates a high-level diagram of an example of a cognitive commuter assistant system, in accordance with embodiments of the present disclosure.

Referring now to FIG. 3, shown is a high-level diagram of an example of a cognitive commuter assistant system 300, in accordance with embodiments of the present disclosure. In embodiments, cognitive commuter assistant 305 may include various components, such as mapping engine 335, conversation analysis engine 315, historical model 360 and conversation output generator 345.

Conversation analysis engine 315 may be substantially similar to, or include, data structuring module 240 of FIG. 2. For example, conversation analysis engine 315 may be capable of structuring data, such as real time audio input 310, and extracting pertinent data therefrom in a machine-readable format. For example, the conversation analysis engine 315 may monitor a conversation between a user/passenger/traveler and a navigator to determine the content of the conversation using audio fingerprinting and natural language processing techniques, as described herein. The conversation analysis engine 315 may identify, for example, location information, conversation topics, etc. Conversation analysis engine 315 may output, for example, location information and/or text outputs to mapping engine 335 and conversation output generator 345.

Mapping engine 335 may retrieve/receive data related to location and traffic and generate route suggestions (e.g., candidate routes). For example, the mapping engine 335 may identify/retrieve, using GPS or other positioning techniques, a current location 330. Likewise, the mapping engine 335 may identify/retrieve a destination 325. Mapping engine 335 may query a traffic data source, such as traffic data 110 of FIG. 1B, to factor in traffic data 320 when generating candidate routes. Mapping engine 335 may further identify/retrieve location information from conversation analysis engine 315. Additionally, conversation analysis engine 315 may continually monitor user-navigator conversation to identify route-related information (e.g., a change in the expected route), conversation topics (e.g., to identify a user or navigator's preferences), perform sentiment analyses (e.g., determine how the navigator is reacting to the conversation), etc. For example, a passenger/user may tell a navigator that he/she wishes to travel to Chicago, thereby indicating the desired destination. The conversation analysis engine 315 may pass this information to the mapping engine 335, which may then locate Chicago's GPS coordinates. The mapping engine 335 may use the passenger device's current GPS coordinates as the current location to generate one or more candidate routes between the current location and Chicago.

In some embodiments, the mapping engine 335 may further take into account traffic data 320 when generating candidate routes. In embodiments, traffic data may include adverse weather, road closures, construction events, etc. In embodiments, the candidate routes may be output to a conversation output generator 345 for incorporation into smart excuses 355. In embodiments, mapping engine 335 may take user preferences 340 into account when generating candidate routes (e.g., candidate routes may be generated factoring in a user's preference to take the shortest route by distance, the shortest route by travel time, the most scenic route, etc.)

Conversation output generator 345 may provide a user/passenger with alerts regarding sensitive topics 350 and smart excuses 355, based on input received from user preferences 340, candidate routes received from mapping engine 335, text outputs received from conversation analysis engine 315, and applying historical model 360. User preferences 340 may include a user preference profile, as described herein, for a single user, or it may include a database of user profiles for a plurality of users that may be queried to retrieve the user preference profile for a particular user.

In embodiments, historical model 360 may include a log of conversations a user has had with navigators in the past. The conversation logs may be structured and the structured conversational data may populate, for example, a relational database or other data structure for annotating and cross-referencing content. This may provide a conversation output generator 345 with the ability to identify what conversation topics should be avoided, based on past conversations' annotations and cross-references to sentiment scores.

In embodiments, historical model 360 may include navigator profiles. For example, as users interact with various navigators, the cognitive commuter assistant may identify or determine demographic or personality characteristics of a particular navigator. Historical model 360 may compile a particular navigator's demographics and personality characteristics into a navigator profile to better predict which conversation topics to avoid and refine smart excuses to optimize navigator sentiments.

In embodiments, historical model 360 may include local information for the current location and/or destination. Local information may include the history of a location/region/country, information regarding the culture of a location/region/country, information regarding ethnic tensions, current events, politics, news, tourist sites, and any other information, based on location/region/country/etc. that may impact a determination of sensitive conversation topics or that may impact a navigator's sentiment.

The data included in historical model 360 may be utilized by a conversation output generator 345 to identify conversation topics that should be utilized and conversation topics that should be avoided, to generate smart excuses that can be used to convince a navigator to alter course, etc.

Conversation output generator 345 may output alerts regarding sensitive topics 350. Alerts regarding sensitive topics 350 may be a list or arrangement of keywords or phrases that a passenger may wish to avoid when conversing with a driver or suggesting an alternate route. Conversation output generator 345 may identify sensitive topics by analyzing local information (e.g., news articles regarding current events/catastrophes, encyclopedic articles regarding local culture, etc.) to determine topics that may cause an emotional reaction on the part of the navigator. For example, a conversation output generator 345 may determine, via encyclopedic articles on New Orleans, that hurricanes and flooding may be sensitive keywords or topics that should be avoided by a passenger/user traveling in southern Louisiana.

Conversation output generator 345 may also output smart excuses, as described herein. Smart excuses may be an excuse with a factual basis, tailored to the preferences of the passenger and/or the navigator and taking into account local information alternate route suggestions, and may be coupled with an alternate route suggestion to form a smart excuse suggestion. The smart excuse may be tailored to the preferences of the passenger and/or the navigator and take into account local information. In embodiments, the smart excuse may be generated to increase the chances of a pleasant interaction while convincing the navigator to travel along the passenger's suggested route.

In embodiments, smart excuse generation may use a set of templates to formulate suggestions. For example, a template for a passenger's smart excuse suggestion may include, "I would like to see X on the way to Y; would it be possible to take Z to get there?" Where X may be a tourist spot, a particular store or attraction, etc. Y may be the passenger's destination, and Z may be one or more streets. Data for the variables may be selected using the mapping engine 335, conversation analysis engine 315, user preferences 340, historical model 360, or one or more of the data sources identified in FIG. 1B. Templates may be periodically updated to account for past conversations logged and recorded in the historical model 360.

Some potential data for the variables may be filtered out, depending on the time of day, weather conditions, user preference profile, etc. For example, if a particular coffee shop is closed during a certain time of day, the cognitive commuter assistant 305 may filter out or avoid generating a smart excuse suggestion based on the excuse that the passenger wants to get coffee at that particular coffee shop.

In embodiments, the cognitive commuter assistant 305 may further monitor the navigator's reaction to the smart excuse suggestion, and calculate a sentiment score based on the monitored reaction. The sentiment score calculation may include using audio fingerprinting and natural language processing to determine the emotions and emotional intensities of a navigator's reaction to a smart excuse suggestion.

For example, the more negative emotional stress exhibited by a navigator, the lower the sentiment score may be. The more emotional a negative connotation of the navigator's word choice is, the lower the sentiment score may be. A low sentiment score may therefore correspond to an unhappy (e.g., angrier, more irritated, more agitated) navigator. Alternatively, positive emotional stress and positive connotations may correspond to a happy navigator, and may produce higher sentiment scores.

In embodiments, sentiment scores may be annotated or cross-referenced with conversations logged and recorded in the historical model 360. When conversations containing similar phrases or patterns are consistently associated with low sentiment scores, the historical model 360 may suggest those phrases/patterns less frequently to the conversation output generator 345. Similarly, when conversations containing similar phrases or patterns are consistently associated with high sentiment scores, the historical model 360 may suggest those phrases/patterns more frequently to the conversation output generator 345, effectively creating a machine-learning loop that adjusts smart excuses and suggestions to optimize navigator sentiment.

In embodiments, the machine learning loop may be specific to a navigator, a region/locality, a language, a passenger, etc. For example, if the machine learning loop is specified by language, the phrases/patterns associated with optimal navigator sentiment in Russian may be different from the phrases/patterns that would result in optimal navigator sentiment in Portuguese.

Figure 4:
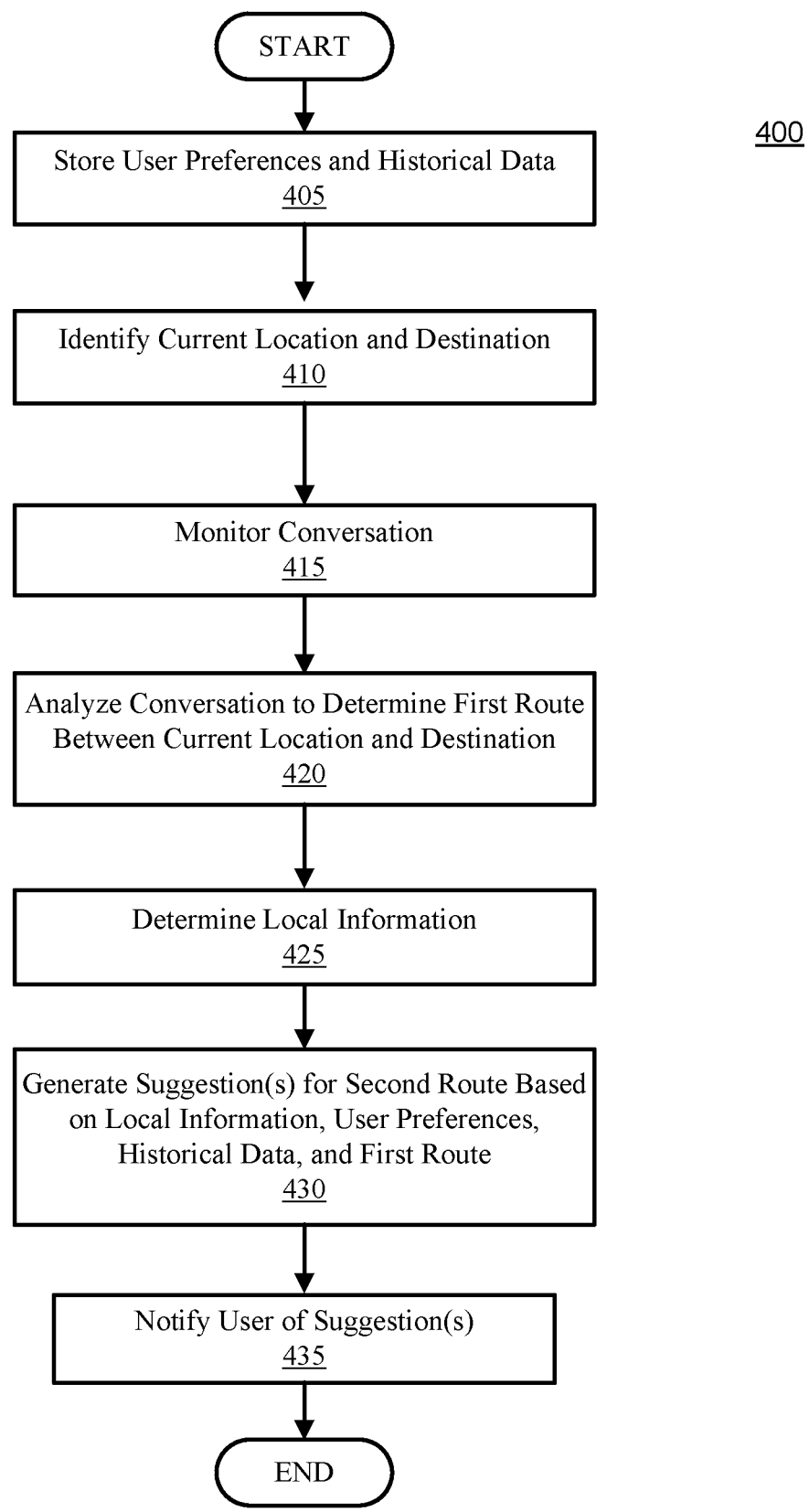
FIG. 4 illustrates a flowchart of a method for generating route suggestions, in accordance with embodiments of the present disclosure.

Referring now to FIG. 4, shown is a flowchart of a method 400 for generating route suggestions, in accordance with embodiments of the present disclosure. At 405, user preferences and historical data are stored. In embodiments, user preferences may include demographic and personal information of a user (e.g., a passenger/commuter/traveler). For example, user preferences 105 may include demographic information (e.g., age, income, occupation, education, residence, etc.) as well as personality information (e.g., likes, dislikes, hobbies, etc.). Preference profiles may be generated with input from a user-completed questionnaire, or by gleaning information from the structured data obtained from conversations between passengers and navigators. In embodiments, preference profiles may be compiled by monitoring or linking a user's social media accounts, e-mails, text messages, etc. to determine personality and demographic information.

In embodiments, historical data may include data corresponding to a particular time and location, such as data regarding past conversations a user/passenger has executed with one or more navigators. Historical data may further include sentiment scores cross-referenced to navigator-commuter conversations, situational data (e.g., data regarding the circumstances/location of conversations), user rating information, etc.

At 410, the user's current location and destination are identified. In embodiments, the user's current location may be identified using GPS-locating techniques. Alternatively, the user's current location may be input directly by the user, or the current location may be determined by analyzing navigator-commuter (e.g., navigator-user/navigator-passenger/navigator-traveler) conversations to identify keywords/phrases associated with a particular location, such as street names, intersections, landmarks, etc.

In embodiments, the user's destination may be determined by input from either the user or the navigator, or by analyzing navigator-commuter conversations to identify keywords/phrases associated with the user's desired destination. For example, a commuter/user may tell the navigator where they wish to go or what their destination is. A cognitive commuter assistant, such as cognitive commuter assistant 305 of FIG. 3 or cognitive commuter assistant 221 of FIG. 2 may employ natural language processing techniques to convert the conversation into machine-readable data and extract or deduce the user's destination from the navigator-commuter conversation.

At 415, conversation between the user and navigator is monitored. Conversation may be monitored by receiving real time audio input, via a microphone attached or embedded in a user device, and using audio and natural language processing techniques to process the audio input data.

At 420, the conversation is analyzed to determine a first route between the user's current location and the user's destination. The analysis may involve audio fingerprinting to identify/parse the voices, and natural language processing techniques to convert audio inputs into machine-readable data. Using the machine-readable data, a cognitive commuter assistant may extract or deduce the user's desired location and any waypoints mentioned in the navigator-commuter conversation. For example, the cognitive commuter assistant may use GPS to determine that the user's current location is the Multnomah Falls in Oregon. The commuter/user may tell the navigator that he/she wishes to travel to the Japanese Gardens in Portland. The navigator may ask if the user wishes to take the Burnside Bridge. The cognitive commuter may determine the most likely route, based on shortest distance or other criteria discussed herein, that starts at Multnomah Falls and ends at the Japanese Gardens in Portland, with a waypoint of the Burnside Bridge.

At 425, local information is determined. In embodiments, local information may include the history of a location/region/country, information regarding the culture and customs of a location/region/country, information regarding ethnic tensions, current events, politics, news, weather, sports, tourist sites, and any other information that may impact a determination of sensitive conversation topics or that may impact a navigator's sentiment. In embodiments, local information may be determined by cross-referencing GPS data (e.g., current location, intermediate locations along a route path, and/or destination) with the results of a web search for news, cultural information, etc. In embodiments, a database of relevant data may be queried, or a particular web site may be queried (e.g., WIKIPEDIA).

At 430, one or more suggestions may be generated for a second route, based on local information, user preferences, historical data, and the first route. For example, the local information may include a crime map or a traffic map of Portland showing the Burnside Bridge as a relatively high crime and high traffic area, but the area around the Hawthorne Bridge as a relatively low crime and traffic area. The user preferences may show that the user enjoys Vietnamese cuisine. Historical data may show that navigators, especially in the Portland region, respond well to route suggestions when they are coupled with an excuse related to food. The first route necessarily shows the current location and the destination. A cognitive commuter assistant may compile all these data to generate a smart excuse suggestion for the user to ask the navigator, "Would it be alright if we took the Hawthorne Bridge so we can drive past Hanoi Vietnamese Kitchen? I'm meeting friends there for dinner and would like to see where it is." In embodiments, the cognitive commuter assistant may have access to a user's schedule, via GOOGLE CALENDAR or another scheduling service and may use this to enhance smart excuse generation. This smart excuse suggestion may provide a convincing reason to avoid the high crime and high traffic associated with the Burnside Bridge, without potentially irritating the navigator.

At 435, the user is notified of one or more smart excuse suggestions. For example, the cognitive commuter assistant may display one or more smart excuse suggestions on the display of a user's mobile device, such as a smartphone, laptop, tablet, etc. In embodiments, the smart excuse suggestions may concurrently appear with a list of sensitive topics the user may wish to avoid when conversing with the driver, such as, for example, current political topics, recent natural disasters, etc.

Figure 5:
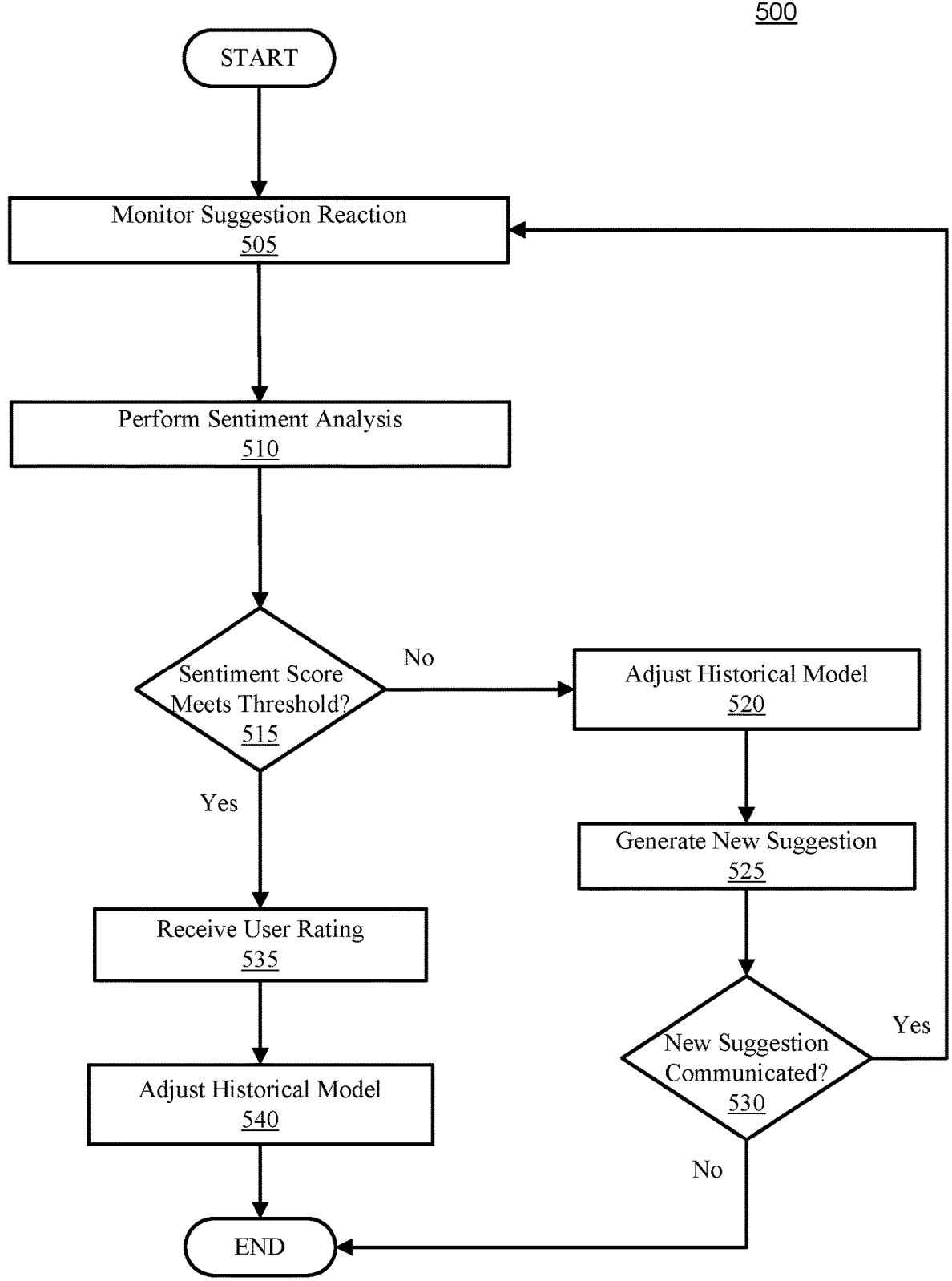
FIG. 5 illustrates a flowchart of a method for monitoring outcomes to adjust route suggestion generation, in accordance with embodiments of the present disclosure.

Referring now to FIG. 5, shown is a flowchart of a method 500 for monitoring outcomes to adjust route suggestion generation, in accordance with embodiments of the present disclosure. At 505, a navigator's reaction to a smart excuse suggestion is monitored. The navigator's reaction may be monitored via audio or video inputs, via a microphone and/or camera attached to, or embedded in, a user's mobile device.

At 510, sentiment analysis of the navigator's reaction is performed. Sentiment analysis may include audio fingerprinting/vocal analysis to identify stress patterns in the navigator's voice, natural language processing to identify connotations associated with the navigator's choice of words, and/or facial recognition techniques to determine the navigator's facial reaction. In embodiments, a user may input (e.g., via buttons, keypad, etc.) whether the navigator is reacting negatively/positively. Sentiment analysis techniques, such as IBM WATSON PERSONALITY INSIGHTS or other sentiment analysis techniques, may be applied to identify the emotions associated with the navigator's reaction, as well as the intensities of those emotions. Sentiment scores may represent a composite of the navigator's emotions, plus their intensities. For example, the more negative the emotion, the lower the sentiment score may be. The emotional intensity may serve to augment the sentiment score; for example, a high intensity of a negative emotion may drive the sentiment score lower. Alternatively, a positive emotion may result in a high emotional score, and a high intensity of a positive emotion may drive the sentiment score higher.

In embodiments, a separate sentiment score may be calculated for the vocal stress pattern, the visual reaction, and the word choice of the navigator. Each sentiment score may be weighted differently to arrive at a weighted sentiment score, or, alternatively, the sentiment scores may be averaged to arrive at an average total sentiment score. For example, if the visual reaction has a 2× weight, the vocal stress pattern's sentiment score is 8, the visual reaction's sentiment score is 5, and the word choice sentiment score is 7, a weighted sentiment score could be calculated as: 8+2 (5)+7=25. Alternatively, an average total sentiment score may be calculated as (8+5+7)/3=6.67.

At 515, it is determined whether the sentiment score meets a threshold. The threshold may represent the point at which the navigator's sentiment reflects a positive/pleasant interaction with the user. In embodiments, the threshold may be set by individual users, by individual navigators, or by analyzing past conversation data and ratings data to determine which sentiment scores correspond to pleasant and unpleasant interactions.

If, at 515, it is determined that the navigator did not react positively to the smart excuse suggestion (e.g., the navigator's sentiment is below threshold), the historical model may be adjusted at 520. Adjusting the historical model may include suggesting a particular smart excuse suggestion template less frequently, as described herein, annotating the particular navigator as disliking a particular smart excuse suggestion, etc. In embodiments, at 525, a new smart excuse suggestion may be generated and presented to the user.

At 530, it may be determined, by analyzing the conversation, whether the new smart excuse suggestion was communicated to the navigator. In embodiments, the user may input whether the user has communicated the new smart excuse suggestion to the navigator.

If, at 515, it is determined that the navigator reacted positively to the smart excuse suggestion (e.g., the navigator's sentiment met the threshold), the cognitive commuter assistant may prompt the user to rate the performance of the cognitive commuter assistant and receive the rating at 535. Ratings may be employed by a 1-5 star system, a 1-10 scale, or any other ratings scheme. In embodiments, user ratings may be utilized to determine user preferences.

At 540, the historical model may be adjusted to reflect the navigator's sentiment and the user's rating, as described herein.

Figure 6:
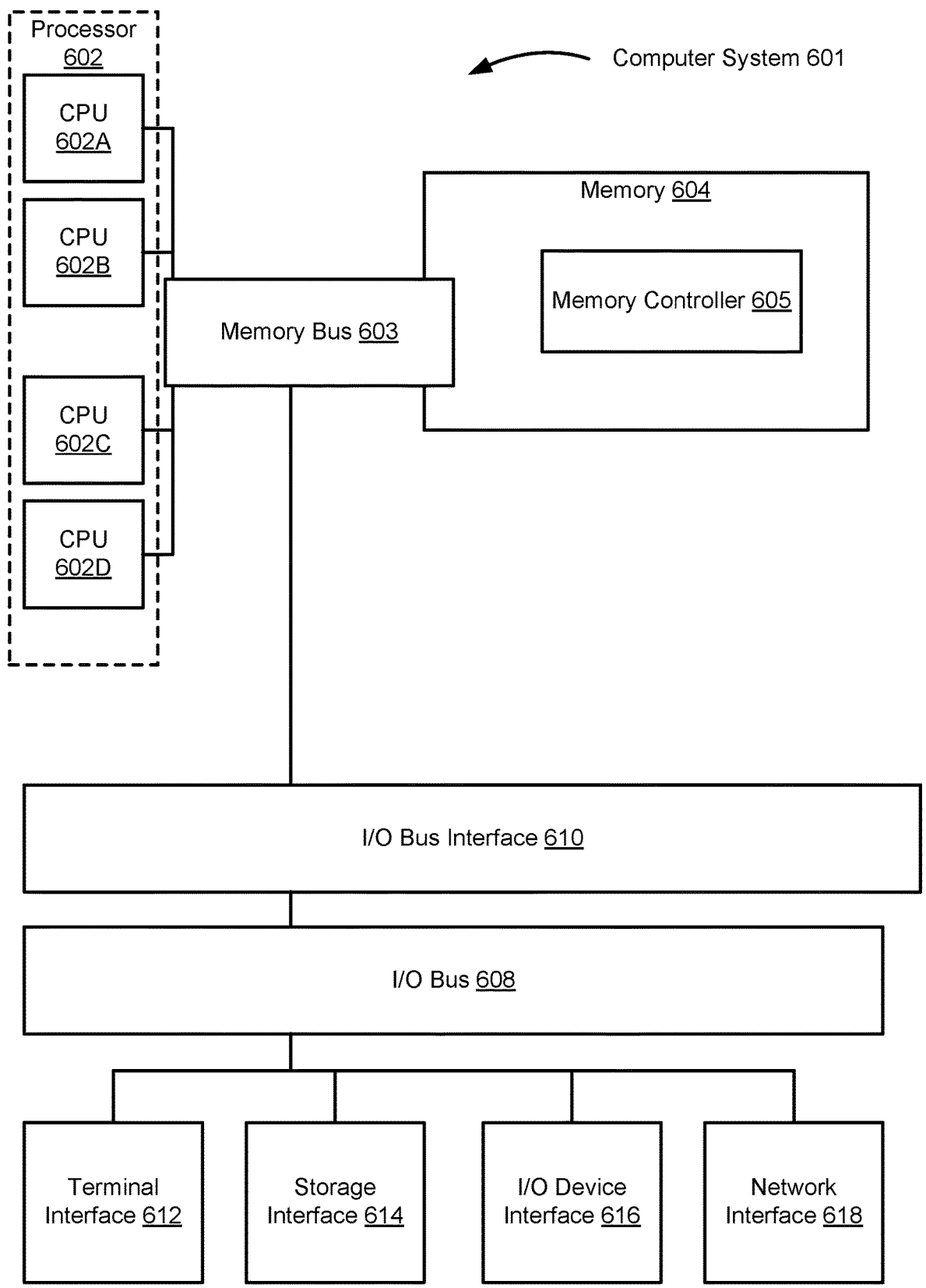
FIG. 6 illustrates a high-level block diagram of an example computer system that may be used in implementing embodiments of the present disclosure.

Referring now to FIG. 6, shown is a high-level block diagram of an example computer system (e.g., computer) 601 that may be configured to perform various aspects of the present disclosure, including, for example, methods 400/500, described in FIGS. 4-5, respectively. The example computer system 601 may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing commuter conversation assistance, the method comprising:
   storing user preferences and historical data for a user;
   identifying, for the user, a current location and a destination;
   monitoring a conversation between the user and a navigator;
   analyzing the conversation between the user and the navigator to determine a first route between the current location and the destination;
   determining, based on the current location, the destination, and the first route, local information;
   generating, based on the local information, the user preferences, the historical data, and the first route, one or more suggestions for a second route, wherein the historical data includes a model for predicting a navigator's response to a suggestion from the one or more suggestions, wherein the model includes data on past navigator-commuter conversations, user ratings of past navigator-commuter conversations, locations, and sentiment analyses of past navigator-commuter conversations; and
   notifying the user of the one or more suggestions.

2. The method of claim 1, wherein the generating one or more suggestions for the second route further comprises generating a fact in support of the second route, based on the local information.

3. The method of claim 1, wherein the generating one or more suggestions for the second route further comprises notifying the user of sensitive topics, based on the local information.

4. The method of claim 3, wherein the sensitive topics are based on the local information and the historical data, the historical data including navigator preferences, and wherein at least one sensitive topic of the sensitive topics is not related to routing.

5. The method of claim 1, further comprising:
   using sentiment analysis to calculate a sentiment score for the navigator's response to the suggestion;
   determining whether the sentiment score meets a threshold; and
   in response to determining that the threshold was met, storing the sentiment score in the historical data.

6. The method of claim 1, wherein the local information includes a navigator profile and information on current events, historical information on events, mapping information, traffic information, safety information, and crime information for the current location, the destination, and intermediate locations.

7. The method of claim 1, wherein the model is adjusted, in response to the user ratings, to maximize future user ratings by changing route suggestions and conversation topics.

8. A system for providing commuter conversation assistance, the system comprising:
   a memory with program instructions stored thereon; and
   a processor in communication with the memory, wherein the system is configured to perform a method, the method comprising:
   storing user preferences and historical data for each user of a plurality of users;
   identifying, for a user, a current location and a destination;
   monitoring a conversation between the user and a navigator;
   analyzing the conversation between the user and the navigator to determine a first route between the current location and the destination;
   determining, based on the current location, the destination, and the first route, local information;
   generating, based on the local information, the user preferences, the historical data, and the first route, one or more suggestions for a second route, wherein the historical data includes a model for predicting a navigator's response to a suggestion from the one or more suggestions wherein the model includes data on past navigator-commuter conversations, user ratings of past navigator-commuter conversations, locations, and sentiment analyses of past navigator-commuter conversations; and
   notifying the user of the one or more suggestions.

9. The system of claim 8, wherein the generating one or more suggestions for the second route further comprises generating a fact in support of the second route, based on the local information.

10. The system of claim 8, wherein the generating one or more suggestions for the second route further comprises notifying the user of sensitive topics, based on the local information.

11. The system of claim 8, wherein the method further comprises:
   using sentiment analysis to calculate a sentiment score for the navigator's response to the suggestion;
   determining whether the sentiment score meets a threshold; and
   in response to determining that the threshold was met, storing the sentiment score in the historical data.

12. The system of claim 8, wherein the local information includes a navigator profile and information on current events, historical information on events, mapping information, traffic information, safety information, and crime information for the current location, the destination, and intermediate locations.

13. The system of claim 8, wherein the model is adjusted, in response to the user ratings, to maximize future user ratings by changing route suggestions and conversation topics.

14. A computer program product for providing commuter conversation assistance, the computer program product comprising a computer readable storage medium having program instructions embodied therewith, the program instructions executable by a device to cause the device to:
   store user preferences and historical data for each user of a plurality of users;
   identify, for a user, a current location and a destination;
   monitor a conversation between the user and a navigator;
   analyze the conversation between the user and the navigator to determine a first route between the current location and the destination;
   determine, based on the current location, the destination, and the first route, local information;
   generate, based on the local information, the user preferences, the historical data, and the first route, one or more suggestions for a second route, wherein the historical data includes a model for predicting a navigator's response to a suggestion from the one or more suggestions wherein the model includes data on past navigator-commuter conversations, user ratings of past navigator-commuter conversations, locations, and sentiment analyses of past navigator-commuter conversations; and
   notify the user of the one or more suggestions.

15. The computer program product of claim 14, wherein the generating one or more suggestions for the second route further comprises generating a fact in support of the second route, based on the local information.

16. The computer program product of claim 14, wherein the generating one or more suggestions for the second route further comprises notifying the user of sensitive topics, based on the local information.

17. The computer program product of claim 14, wherein the program instructions further cause the device to:
   use sentiment analysis to calculate a sentiment score for the navigator's response to the suggestion;
   determine whether the sentiment score meets a threshold; and
   in response to determining that the threshold was met, store the sentiment score in the historical data.

* * * * *